Patented July 2, 1929.

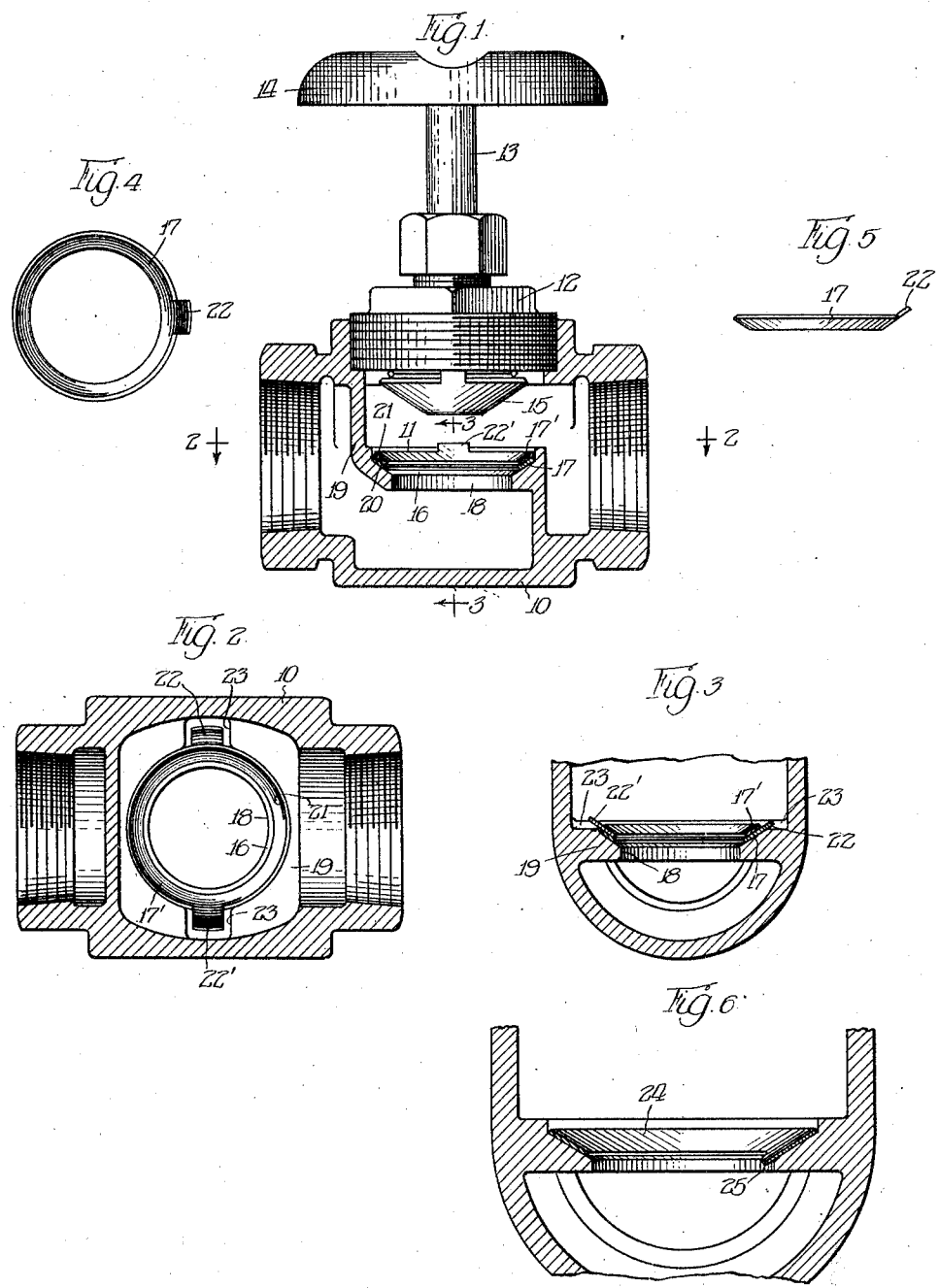

1,719,316

UNITED STATES PATENT OFFICE.

JOSEPH H. APPLETON, OF OSHKOSH, WISCONSIN, ASSIGNOR TO CENTRAL VALVE MFG., CO., OF CHICAGO, ILLINOIS, A CORPORATION OF DELAWARE.

VALVE.

Application filed March 25, 1927. Serial No. 178,175.

This invention relates to valves of the type in which one or more readily replaceable seat plates are used.

The purpose of the invention is to provide, in such a valve, an improved seat plate which requires but a very simple master seat structure for cooperation therewith, is extremely easy to apply or remove, is inexpensive to manufacture, and may be used either singly or in multiple.

Other aims and advantages of the invention will undoubtedly occur to those skilled in the art upon a full understanding of the nature of the improvement.

Several different forms of the invention are presented herein by way of illustration, but the invention may obviously be embodied in still other structural forms.

In the accompanying drawings:

Fig. 1 is a vertical section through a valve equipped with one form of the invention;

Fig. 2 is a horizontal section, taken on the line 2—2 of Fig. 1;

Fig. 3 is a fragmentary vertical section, taken on the line 3—3 of Fig. 1;

Fig. 4 is a plan view of one of the seat plates shown in Figs. 1, 2 and 3;

Fig. 5 is a side view of the same;

Fig. 6 is a fragmentary vertical section, corresponding to Fig. 3, showing a valve seat embodying another form of the invention.

The form of the invention illustrated in Figs. 1 to 5 inclusive will first be described. The valve structure used therein to exemplify the invention is of the so-called globe type, and consists of a body 10, a seat 11, a bonnet 12, a stem 13, a handle 14, and a head 15.

The seat 11—which is the part of the valve in which the invention resides—includes a master seat 16 and one or more readily replaceable seat plates 17, 17'. The master seat 16 encircles an aperture 18 in a partition 19 in the body 10, and is characterized by an inner conical face 20 and an outer cylindrical face 21. The seat plates 17, 17' are centrally apertured, and are conical to the same extent as the inner face 20 of the master seat. The lower plate 17 is bottomed against the master seat, and the upper plate 17' is in turn bottomed against the lower plate.

The seat plates are of such over-all diameter relative to the outer cylindrical face 21 of the master seat as to necessitate the plates being forced downwardly under pressure in being bottomed, and such forced fit serves to hold the plates against accidental displacement after once being positioned. The apertures in the plates are preferably a little larger than the opening 18 in the master seat, whereby to prevent the column of steam or other fluid rushing through the opening in the master seat from flowing directly against the inner edges of the plates.

The seat plates are provided with peripheral ears 22, 22' for use when removing the plates from the master seat. The ears are disposed in recesses 23 in the partition 19 at the sides of the master seat, with the ear of one plate in a different recess from the ear of the next plate.

When it becomes necessary to remove the upper plate 17' owing to the same having become cut or otherwise unfit for further service, a screw driver or other sharp pointed instrument is inserted behind and beneath the ear 22' of that plate and is twisted in such a way as to bend the ear up into a position where it can be engaged with pliers. The ear is then pulled with pliers, and the plate is removed without difficulty, the action of the pliers in pulling on the ear serving to buckle the plate a little at that point and destroy the forced fit previously existing between the periphery of the plate and the cylindrical face of the master seat. The lower plate may of course be removed in the same way.

In Fig. 6 is shown another form of the invention wherein the seat plate 24, instead of having an ear on the outer periphery thereof disposed within a recess in the partition adjacent the master seat, is provided with an ear 25 on the inner periphery thereof, which ear may be easily grasped with pliers when it becomes necessary to move the plate.

I claim:

1. In a valve, a conical seat having a cylindrical side, and a conical seat plate held in position against the bottom of the seat by a forced fit with the side of the seat.

2. In a valve, a conical seat having a cylindrical side, and a conical seat plate held in position against the bottom of the seat by a forced fit with the side of the seat, said plate having a portion which is separated from the seat and is adapted to be engaged by a tool in effecting removal of the plate.

3. In a valve, a seat having a recess at one side thereof, and a seat plate positioned against the seat and having a peripheral ear projecting into the recess, which ear is adapted to be engaged by a tool in effecting removal of the plate.

4. A centrally apertured conical seat plate having an inclined ear formed on the outer periphery thereof as a continuation of the conical face of the plate for engagement by a tool in effecting removal of the plate from a valve seat.

5. In a valve, a seat, a seat plate positioned thereagainst, means for holding the plate against the seat, and an ear on the plate which is disposed in a position where it is directly accessible from above the seat when the plate is secured against the seat for engagement by a tool in effecting removal of the plate from the seat.

6. In a valve, a conical seat, a conical seat plate positioned thereagainst, means for holding the plate against the seat, and a peripheral ear on the plate which projects into a position directly accessible from above the seat when the plate is secured against the seat for engagement by a tool in effecting removal of the plate from the seat.

7. A centrally apertured seat plate for application to a valve seat, characterized by an ear on its outer periphery which is disposed in a position wherein it is directly accessible from the seat when the plate is applied thereto for engagement by a tool in effecting removal of the plate from the seat.

In testimony whereof I have hereunto subscribed my name.

JOSEPH H. APPLETON.